United States Patent
Stone

(12) 
(10) Patent No.: US 6,523,137 B1
(45) Date of Patent: Feb. 18, 2003

(54) METHOD AND SYSTEM FOR REMOTE TESTING OF APPLICATION PROGRAM INTERFACES

(75) Inventor: Jeffrey D. Stone, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/416,313

(22) Filed: Oct. 12, 1999

(51) Int. Cl.$^7$ .................................................. H02H 3/05
(52) U.S. Cl. ........................................... 714/38; 714/37
(58) Field of Search ........................... 714/38, 37, 39, 714/40; 717/1, 2, 4

(56) References Cited

U.S. PATENT DOCUMENTS

| | | | |
|---|---|---|---|
| 5,630,049 A | * 5/1997 | Cardoza et al. ............... | 714/25 |
| 6,006,260 A | * 12/1999 | Barrick, Jr. et al. ......... | 709/224 |
| 6,085,244 A | * 7/2000 | Wookey ...................... | 709/224 |
| 6,108,782 A | * 8/2000 | Fletcher et al. ............. | 713/153 |
| 6,317,706 B1 | * 11/2001 | Saib ............................ | 703/27 |

* cited by examiner

*Primary Examiner*—Dieu-Minh Le
(74) *Attorney, Agent, or Firm*—Sierra Patent Group, Ltd.

(57) ABSTRACT

A system and method for remotely testing application program interface function calls within a software application under test which does not require a priori programming of function-specific algorithms within the software application under test. The invention provides a lookup agent within the software application under test for determining indirect reference values and a component test framework for handling messaging between the software application under test and a test application.

5 Claims, 3 Drawing Sheets

METHOD AND SYSTEM FOR REMOTE TESTING OF APPLICATION PROGRAM INTERFACES

BACKGROUND OF THE INVENTION

1. Field of the Invention

This invention pertains generally to remote software application testing. More particularly, the invention is a method for remotely testing application program interface function calls within a software application under test which does not require a priori programming of remote procedure calls or other function-specific algorithms within the software application under test. The invention provides a lookup agent within the software application under test for determining indirect reference values and a component test framework for handling messaging between the software application under test and the test application.

2. The Prior Art

It is often necessary to test a software application in a configuration where the test program or application resides in or is executing in a different computer from the software application under test. In other cases, the test application resides on the same computer as the software application under test, but the test application executes within a different memory address space from the software application under test. In either case, the test application is considered "remote" from the software application under test, because the test application does not have access to the memory address spaces used by the software application under test. Thus the test application is not able to determine certain values ascertainable from the software application under test.

For example, the test application is not able to determine values which are "indirectly referenced" by the software application under test. Values such as structures and arrays or values containing pointers to other structures, arrays or values, for example, are indirect references having values which are not normally determinable from the test application, because the address space reference by such indirect references are not available to the test application as is well known in the art.

This inability to determine the values of indirectly referenced objects presents a serious problem in the field of remote testing because in order for the remote test application to check values of arguments in functions calls, including application program interface (API) function calls, made by the software application under test, the values of such arguments within the function calls must be also determinable. However, since function calls may include one or more arguments which include indirect references, the values of which are inaccessible remotely as described above, remote testing of such function calls involving indirect references is severely limited accordingly.

The current approach to providing the actual values of indirect references provided in function calls involves "pre-packaging" function calls. Where function calls include arguments having indirect references, this approach extracts the values of such arguments a priori from memory and/or using a local call to obtain such indirect reference values. After determining the value of each indirect reference, the function call including the actual values packaged therewith is suitable for use by the remote test application.

Several disadvantages are presented by the prior art approach of pre-packaging. First, the task of pre-packaging function calls involves a substantial amount of development time in tracking the actual value of interest, particularly because indirect references may include further indirect references. For example, a first pointer object may reference a structure object which further references a second pointer object. Thus, ascertaining the actual value of an indirect reference may involve tracking a plurality of other indirect references. Second, as structures or function calls are changed, the pre-packaging effort of tracking the actual values of indirect references must be repeated to ensure accurate manual referencing in the software application under test resulting in additional development time and costs.

These disadvantages are also present with systems using remote procedure call (RPC). RPC is a type of protocol that allows a client program on one computer to execute a program on a server computer. Using RPC, a system developer need not develop specific procedures for the server. Instead, the client program sends a message to the server with appropriate arguments and the server returns a message containing the results of the program executed. The arguments provided by the client messages to the server must be resolved to actual values if the arguments involve indirect references in order to provide remote testing of such messages, because as noted above, remote test applications do not have access to the memory address space pointed to by indirect references. The process of resolving indirect references to actual values requires a development effort and expense similar to that described above for pre-packaging function calls.

Furthermore, it is often disadvantageous to have the developer of the software application under test provide the code required to make such software application "test-ready" (i.e., providing code to make such application suitable for test) because the developer may be unfamiliar with the techniques used by a tester to test software applications. Likewise, it is disadvantageous to have the tester provide code within the software application under test to make such application "test-ready" because the tester may be unfamiliar with the specifics of the software application code. It is desirable to have the software application under test be independent from the test application wherein the tester need only be familiar with the function calls provided by the software application under, not the specific implementation of the function calls.

Accordingly, there is a need for a method and system for remote testing of software applications which does not require a priori programming of remote procedure calls or other function-specific algorithms within the software application under test. The present invention satisfies these needs, as well as others, and generally overcomes the deficiencies found in the background art.

An object of the invention is to provide a method and system for remote testing of software applications which overcomes the prior art.

Another object of the invention is to provide a method and system for remote testing of software applications which does not require a priori programming of remote procedure calls or other function-specific algorithms within the software application under test.

Another object of the invention is to provide a method and system for remote testing of software applications which provides a lookup agent within the software application under test for determining indirect reference values and a component test framework for handling messaging between the software application under test and the test application.

Another object of the invention is to provide a method and system for remote testing of software applications which provides a method for ascertaining the values of indirect reference objects without function-specific algorithms within the software application under test.

Another object of the invention is to provide a method and system for remote testing of software applications having function calls with one or more arguments including an indirect reference which does not require function-specific algorithms within the software application under test.

BRIEF DESCRIPTION OF THE INVENTION

The present invention is a system and method for remotely testing function calls made by a software application by providing a mechanism for externally intercepting the function calls made by the software application and a mechanism for determining the values of arguments having indirect references within each of the function calls.

In its most general terms, the system of the invention provides a lookup agent, a component test framework (CTF) operatively coupled to the software application under test (component under test), and a test application operatively coupled to the CTF.

The lookup agent carries out the operation of ascertaining indirect reference values contained within the component under test. The software code of the lookup agent is provided or included within the code of the component under test and operates in the same address space as the component under test to thereby enable the lookup agent to have access to the memory address space of the component under test. Under this arrangement, the lookup agent is able to ascertain the values of structures, arrays, pointers and other data types having indirect references.

The component test framework (CTF) carries out the operation of handling messaging between the component under test and the test application. Normally, the CTF operates in a different memory address space from the component under test but is configured to ascertain or otherwise intercept function calls made by the component under test. For example, the component under test may include one or more function calls to another component or a remote program (other component). During interception of these function calls, the CTF also ascertains the arguments provided in the function calls. As noted above, some of these arguments may be actual values while other arguments may include indirect references. The CTF transmits the function calls including its associated first-level arguments to the test application for testing. As described further below, the test application includes an algorithm for testing each of the function calls and providing a resultant value to each of the function calls. The CTF then provides this resultant value to the component under test as a response to each of the function calls made by the component under test.

The CTF also manages commands issued by the test application to the lookup agent and results provided by the lookup agent to the test application. For example, the test application may request the value of a particular argument which contains an indirect reference. The CTF communicates this request from the test application to the lookup agent, which in response to the request, accesses the memory address of the argument requested to ascertain the value of the argument, and then provides the argument value to the CTF. The CTF receives the argument value and communicates the value to the test application for further processing. In certain cases the argument value returned to the test application is another indirect reference, in which case the above described steps for requesting the value of the argument is repeated for the new argument value returned.

The test application carries out the operation of testing, among other things, the function calls made by the component under test. As noted above, each function may include one or more arguments, some of which may be actual values while other arguments may include indirect references. In order for the test application to check the values of the arguments to a function call, the test application must have access to the argument values.

During testing, the CTF will intercept and transmit function calls made by the component under test to the test application for testing. The test application tests or checks each function call transmitted from the CTF using a variety of means as is known in the art. For example, the CTF may intercept an "open" function call. Any arguments used in the function call that include an indirect reference must be resolved to the actual data value referenced by the arguments.

To obtain the argument's value, the test application makes a request to the lookup agent via the CTF, and the value of such an argument is returned from the lookup agent to the test application via the CTF as described above. However, in some instances, the argument value returned to the test application is another indirect reference, in which case the above described steps for requesting the value of the argument is repeated again for the argument value returned.

Once all the indirectly referenced arguments are resolved to their actual data values, a check of the function call can then be made using means well known in the art. In an illustrative body of the invention, the test application may directly reply to a function call by providing a resultant value for the function call which is communicated to the component under test via the CTF. Alternatively, the test application may simply "authorize" the function call in which case the function call is carried out directly with the "other component" which provides the resultant value of the function call to the component under test. Where errors are detected in the function call, the test application may provide a message to the test user of the invention to identify the error detected. Other error-checking mechanisms known in the art may also be used with the invention.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
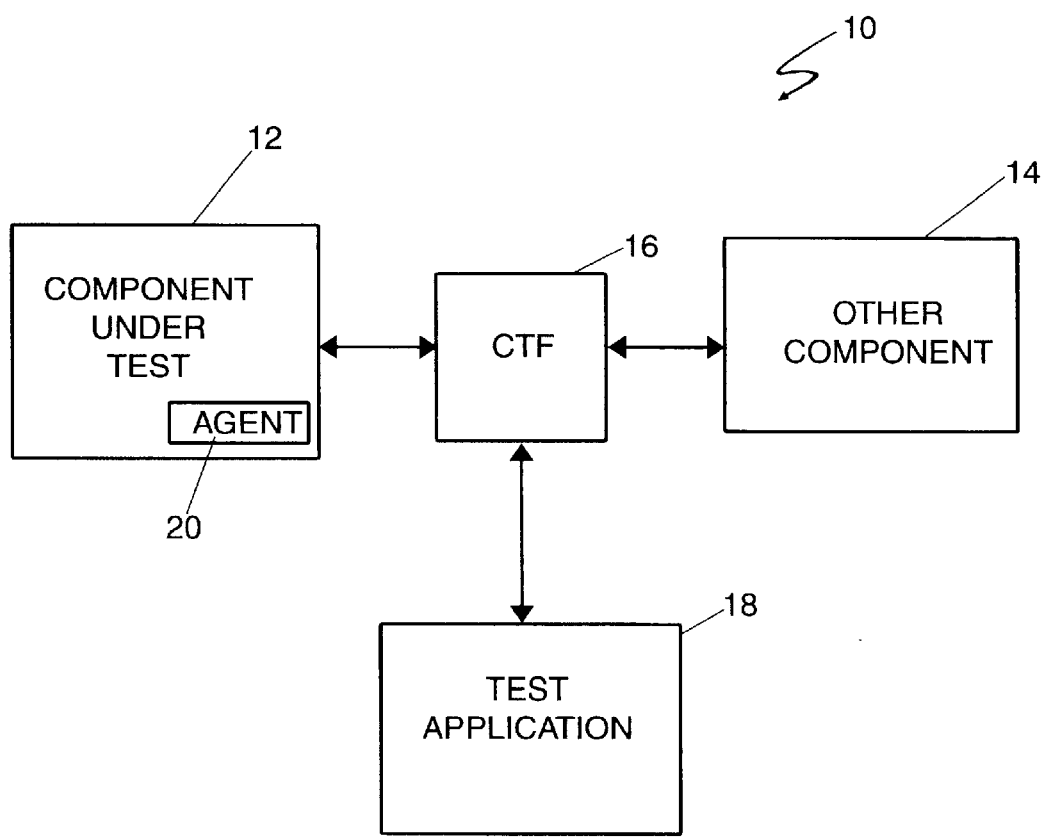
FIG. 1 is a block diagram showing generally a system in accordance with the present invention.
Figure 2:
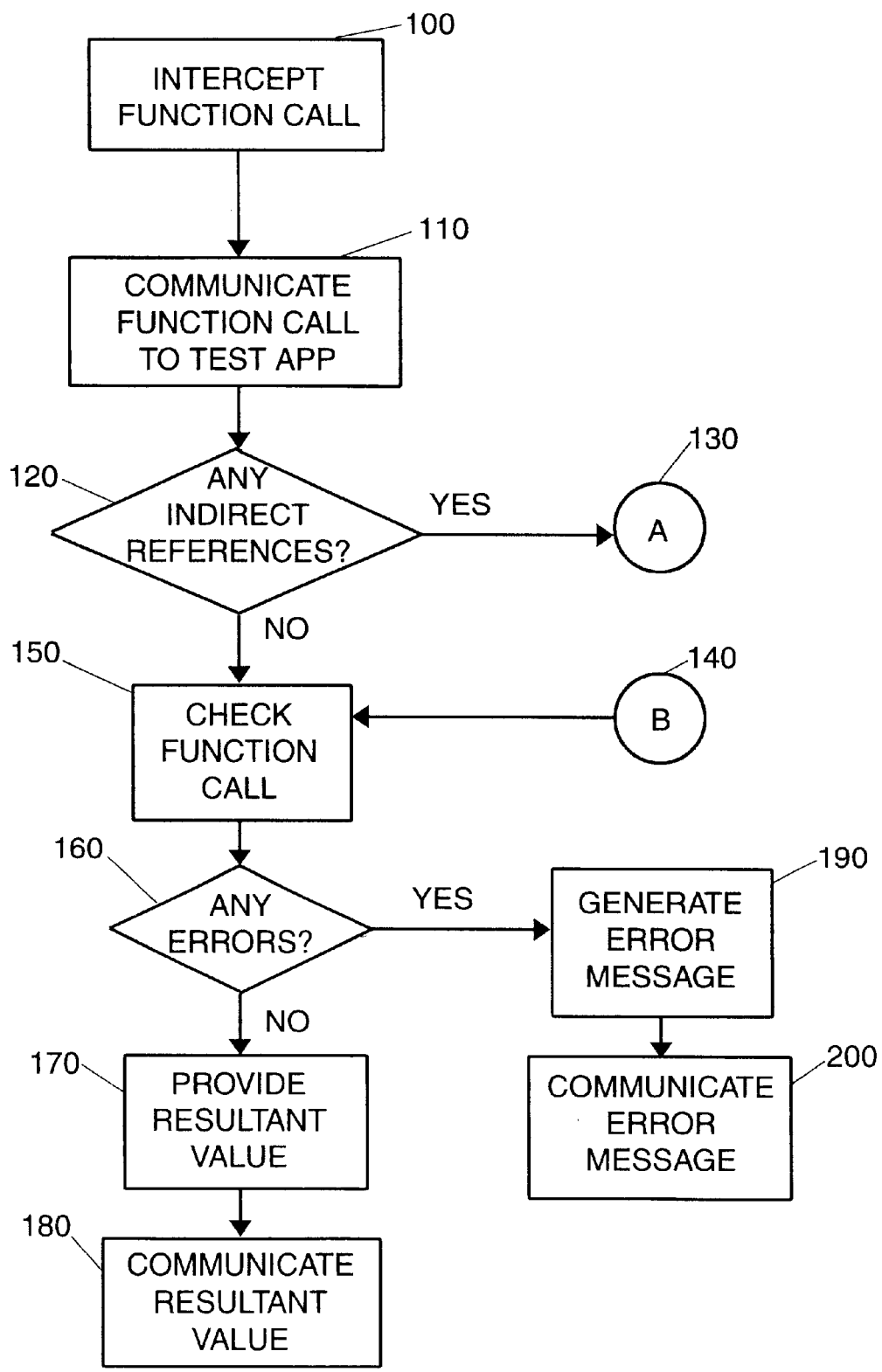
FIG. 2 is a flow chart showing generally the steps of remotely testing function calls.
Figure 3:
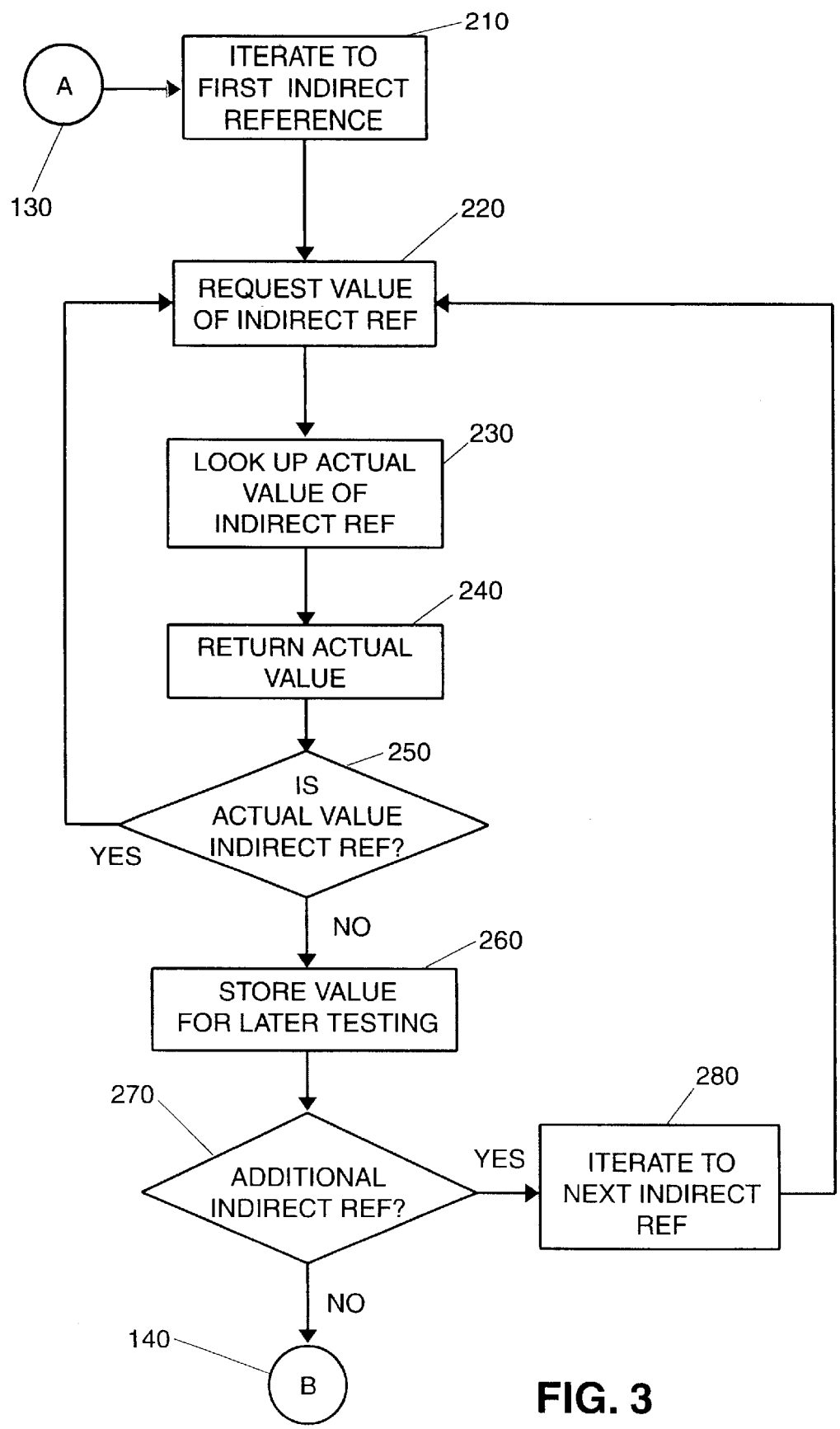
FIG. 3 is a flow chart showing generally the steps of resolving indirect reference data types from an external application.

Referring more specifically to the drawings, for illustrative purposes the present invention is embodied in the apparatus shown FIG. 1 and the method outlined in FIG. 2 and FIG. 3. It will be appreciated that the apparatus may vary as to configuration and as to details of the parts, and that the method may vary as to details and the order of the steps, without departing from the basic concepts as disclosed herein. The invention is disclosed generally in terms of remote testing of application program interface function calls, although numerous other uses for the invention will suggest themselves to persons of ordinary skill in the art.

Referring first to FIG. 1, there is shown generally a system 10 in accordance with the present invention. System 10 includes a component under test (CUT) 12 operatively coupled to a component test framework (CTF) 16. The CTF 16 is operatively coupled for communication to the CUT 12 and to another component or remote program (other component) 14. A test application 18 is operatively coupled to the CTF 16. The CUT 12, the other component 14, the CTF 16, and the test application 18 are each software applications, each normally operating in a separate memory address space from the others. In some cases, the test application 18 resides and executes in a separate computer or data processing means from the CUT 12, the other component 14, and the CTF 16.

The CUT 12 is typically a software application which is the target for testing. More particularly, the CUT 12 comprises router application software which may be integrated with a router internetwork operating system (IOS). The CUT 12 includes various routines and procedures for carrying out its tasks. As such, the CUT 12 may include one or more function calls to the other component 14. For example, the CUT 12 may include one or more application program interface (API) function calls.

API function calls may include one or more arguments or parameters which are normally passed from the CUT 12 to the other component 14. These arguments are used by the other component 14 in generating a function result which is returned to the component under test. As described further below, these function calls are intercepted and tested during the operation of the invention.

A lookup agent 20 is provided within the CUT 12. The lookup agent 20 is a portion of software code that is included within the software code of the CUT 12 and carries out the operation of ascertaining variable data values maintained by the CUT 12. It will be appreciated that the lookup agent 20 only provides code for ascertaining values in memory address spaces and is not a function specific implementation tailored to each function call within the CUT 12 as is implemented in the prior art. Since the lookup agent 20 operates within the same memory address space as the CUT 12, the lookup agent 20 is able to look up values of indirect references maintained by the CUT 12. As described further below, the agent 20 accepts request to ascertain values of "indirect references", ascertains these values, and communicates the values to the requesting component.

The component test framework (CTF) 16 is operatively coupled for communication to the CUT 12. The CTF 16 is a software application which carries out the operation of intercepting function calls made by the CUT 12 to the other component 14. During interception, The CTF 16 captures the function call and arguments which are passed as part of the function call as is known in the art. Thus, the CTF 16 captures the "first-level" arguments contained within the function call.

The first-level arguments may comprise "indirect references" such as structures, arrays, pointers, and other like data types. Since, the CTF 16 operates in a separate memory address space from the CUT 12, the CTF 16 is not able to determine the actual values contained by arguments which are "indirect references".

After incepting the function call made by the CUT 12, the CTF 16 communicates the function call and the associated first-level arguments, if any, to the test application 18 for further processing.

The CTF 16 also carries out other messaging tasks including handling message requests from the test application 18 to the lookup agent 20. For example, the CTF 16 communicates requests to ascertain the value of an argument from the test application 18 to the lookup agent 20. The value of this argument is ascertained by the lookup agent 20 and is communicated to the test application 18 via the CTF 16.

The test application 18 is operatively coupled for communication to the CTF 16 and carries out the operation of checking or testing the CUT 12. Various testing means as is known in the art are used by the test application 18 to validate the software code of the CUT 12. Among other things, the test application 18 checks the function calls made by the CUT 12. In the present illustrative example depicted in FIG. 1, the CUT 12 makes calls to the other component 14. However, the present invention is suitable for use where the CUT 12 makes functions calls to a plurality of other components.

As described above, the function calls made by the CUT 12 are intercepted by the CTF 16. The CTF 16 communicates the function calls and the associated first-level arguments to the test application 18 for testing. As noted above, some of the arguments may comprise indirect references. Since the test application 18 operates in a separate memory address space from the CUT 12, the test application 18 is not able to directly access the values of these indirect references. Thus, the test application 18 further includes routines for resolving arguments containing indirect references.

The steps for resolving indirect references to actual values are described more fully in conjunction with FIG. 3 below. In general, the test application 18 requests the value of an argument containing an indirect reference from the lookup agent 20 via the CTF 16. The lookup agent 20 ascertains the requested value and communicates the value to the test application 18 via the CTF 16. The test application 18 checks the value returned by the lookup agent 20, and if the returned value is another indirect reference, the test application 18 makes another request for data using the returned value. The process is repeated until the value returned by the lookup agent is an actual data value rather than an indirect reference.

It will be appreciated that system 10 is only exemplary and that various configurations are suitable for use with the present invention. For example, a system (not shown) may incorporate a dynamic link library (DLL) component (not shown) coupled therewith. In such a configuration, the DLL and the CUT 12 share the same address space. As such, it would be appropriate for the lookup agent 20 to be included in the software code of the DLL rather than in the CUT 12. Also in this situation, function calls made by the DLL would be intercepted by the CTF 16 and the routines for testing such functions calls would be carried out using the method of the present invention.

The method and operation of invention will be more fully understood with reference to the flow charts of FIG. 2 and FIG. 3, as well as FIG. 1. FIG. 2 is a flow chart showing generally the steps of remotely testing function calls. FIG. 3 is a flow chart showing generally the steps of resolving indirect reference data types from an external application. The order of steps as shown in FIG. 2 and FIG. 3 and described below are only exemplary, and should not be considered limiting.

Referring now to FIG. 2, there is shown generally the steps of remotely testing function calls. As described here, the test application 18 validates function calls, such as API function calls, made by the CUT 12 which operates in a separate memory address space from the test application 18. In addition to testing function calls, the test application 18 may validate other aspects of the software code of the CUT 12.

At step 100, the CTF 16 intercepts a function call made by the CUT 12. The function call may include one ore more arguments some of which may include indirect references, as described above. The CTF 16 captures the function call including the associated arguments, if any. Step 110 is then carried out.

At step 110, the CTF 16 communicates the intercepted function call and the associated arguments to the test application for further testing. Step 120 is then carried out.

At step 120, the test application 18 receives the function call information from the CTF 16. The test application 18 inspects each argument, if any, to determine whether any of the arguments in the function call comprise indirect references. If at least one argument is an indirect reference, step 130 is carried out to resolve such indirect references into actual data values. Otherwise step 150 is carried out.

At step 130, the indirect reference arguments are resolved to actual values. The steps for resolving these indirect references are described more fully in conjunction with FIG. 3 below.

At step 140, the indirect reference arguments have been resolved to actual data values (as described in FIG. 3). Normally such actual values are stored in a data structure such as a variable for use in testing the validity of the function call under test as described in step 150. Step 150 is then carried out.

At step 150, the test application 18 checks the function call captured in step 100. The check is carried out using the actual data values either provided in the function call or as resolved from indirect references as described in FIG. 3. Various means for checking the validity of the function call is carried out as is known in the art. For example, the values of the arguments provided by the CUT 12 are checked against values expected by the test application 18. Step 160 is then carried out.

At step 160, the test application 18 determines whether any errors were detected during the check performed in step 150. If any errors were detected, step 190 is carried out to generate an error message to the user. Otherwise, step 170 is carried out.

At step 170, the test application 18 has determined that no errors were detected during the check of the function call. The test application 18 then provides a resultant value for the function call. Alternatively, the test application 18 may authorize the CTF 16 to carry out the function call request with the other component 14 which provides the resultant value for the function call. Step 180 is then carried out.

At step 180, the resultant value is communicated to the CUT 12. If the test application 18 provides the resultant value, this value is communicated from the test application 18 to the CUT 12 via the CTF 16. If the resultant value is provided by the other component 14 as authorized by the test application 18, the resultant value is communicated from the other component 14 to the CUT 12 via the CTF 16.

At step 190, the test application 18 has determined that an error was detected during the check of the function call as carried out in step 150. The test application 18 generates an error message identifying the error detected. Step 200 is then carried out.

At step 200, the test application 18 communicates the error message to the user. Normally the error message is communicated to the user of the test application 18 using standard display means as is known in the art. For example, in a graphical user interface (GUI) environment, a dialog box may be used to indicate the error detected. Alternatively, the error may be recorded in a log, which may be later viewed using standard reporting means as is known in the art. Additionally, an error message may be transmitted to the CUT 12 via the CTF 16 to notify the CUT 12 that an error was generated by the function call inspected at step 100.

The steps outlined here are repeated for each function call made by the CUT 12 to validate the software code and function calls made by CUT 12. The use of a lookup agent 20 requires no "function-specific" coding or development in the target application (CUT 12) for testing and allows remote testing of such applications without extensive interdependence between the CUT 12 and the test application 18. While the system 10 describes the CTF 16 as an independent entity from the test application 18, the invention is also suitable for use where the CTF 16 and the test application is combined into a single software application.

Referring next to FIG. 3, there is generally shown the steps of resolving indirect references using an external application and a lookup agent.

At step 130, indirect references were detected in the function arguments by the test application 18 as described in step 120 above in conjunction with FIG. 2. Step 210 is then carried out.

At step 210, the test application 18 iterates or inspects the first indirect reference argument for consideration. The steps described below are repeated for each indirect reference argument contained within the function call. Step 220 is then carried out.

At step 220, the test application 18 makes a request for the actual data value of the indirect reference under consideration. This request is communicated to the CTF 16. The CTF 16 then communicates this request to the lookup agent 20 in the CUT 12.

At step 230, the lookup agent 20 receives the request of step 220. In response to this request, the lookup agent 20 accesses the memory address space referenced by the request of step 220. The lookup agent 20 then ascertains the data value contained in the memory address space. Step 240 is then carried out.

At step 240, the lookup agent 20 transmits the data value requested to the CTF 16. The CTF 16 receives the data value transmitted by the lookup agent 20 and communicates this data value to the test application 18. Step 250 is then carried out.

At step 250, the test application 18 receives the data value from the CTF 16. The test application 18 then determines whether data value returned from step 240 is an indirect reference to another value. If so, step 220 is repeated again to obtain the value referenced by the data value returned from step 240. Otherwise, step 260 is carried out.

At step 260, the test application 18 has obtained the actual data value represented by the original indirect reference argument. This actual data value is stored in a variable and is evaluated in conjunction with the function call as described above in step 150 of FIG. 2. Step 270 is then carried out.

At step 270, the test application 18 determines whether additional indirect reference arguments are to be resolved. This situation arises when a function call includes more than one argument, each having and indirect reference. If there are additional indirect reference arguments, step 280 is then carried out to resolve additional indirect reference arguments. Otherwise step 140 is then carried out.

At step 280, the test application iterates to the next indirect reference argument for consideration. Step 220 is then carried out to resolve and obtain the actual data value represented by the current indirect reference argument.

At step 140, the test application has resolved all indirect reference arguments of the function call into actual data values. The actual data values are temporarily stored in a variable for evaluation in step 150 of FIG. 2. Step 150 of FIG. 2 is then carried out to check the function call with the actual data values resolved as described above.

Accordingly, it will be seen that this invention provides a method and system for remote testing of software applications which does not require a priori programming of remote procedure calls or other function-specific algorithms within the software application under test, and which provides routines for externally resolving indirect reference values contained in the software application under test. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for remotely testing a software application comprising: executing said software application;
   intercepting a function call including a passed argument made by said software application by a component test framework that handles messaging between said software application and a test application;
   communicating said function call from said component test framework to said test application;
   reading said passed argument from said function call;
   transmitting a request a variable value of for variable values from said passed argument from a lookup agent that resides in memory space of said software application to determine variable values;
   resolving said variable values of said passed argument in said lookup agent;
   transmitting said variable values of said passed argument from said lookup agent to said test application; and
   checking validity of said function call using said variable values of said passed argument in said test application.

2. The method of claim 1, wherein said ascertaining, by said test application argument values of each of said function call comprises:
   inspecting passed argument of said function call by said test application;
   determining whether said passed argument comprises a first indirect reference;
   transmitting said request to said lookup agent responsive to said passed argument being said first indirect reference;
   determining said value of said first indirect reference by said lookup agent;
   providing, by said lookup agent, said value of said first indirect reference to said test application via said component test framework;
   determining whether said value of said first indirect reference comprises a second indirect reference;
   repeating said steps of determining and providing with said second indirect reference when said value of said first indirect reference comprises a second indirect reference.

3. The method of claim 1 wherein said function calls comprise application interface function calls.

4. The method of claim 1, further comprising:
   calculating, by said test application, a result value for each said function call;
   providing said result value to said component test framework by said test application; and
   communicating said result value to said software application by said component test framework.

5. The method of claim 1 wherein said checking each said function call using said argument values further comprises:
   detecting and identifying errors associated with each said function call; and
   generating an error message if an error is detected.

* * * * *